(12) United States Patent
Leabman

(10) Patent No.: US 7,263,335 B2
(45) Date of Patent: Aug. 28, 2007

(54) MULTI-CONNECTION, NON-SIMULTANEOUS FREQUENCY DIVERSITY IN RADIO COMMUNICATION SYSTEMS

(75) Inventor: Michael Leabman, Sunnyvale, CA (US)

(73) Assignee: PureWave Networks, Inc., Mountain View, CA (US)

( * ) Notice: Subject to any disclaimer, the term of this patent is extended or adjusted under 35 U.S.C. 154(b) by 39 days.

(21) Appl. No.: 10/893,823

(22) Filed: Jul. 19, 2004

(65) Prior Publication Data

US 2006/0013335 A1    Jan. 19, 2006

(51) Int. Cl.
*H04B 1/02* (2006.01)
*H04B 7/02* (2006.01)

(52) U.S. Cl. .................. 455/73; 455/101; 455/103; 375/299

(58) Field of Classification Search ........ 455/504–506, 455/101–106, 78–85, 552.1, 553.1; 375/299, 375/347, 267; 370/330, 345
See application file for complete search history.

(56) References Cited

U.S. PATENT DOCUMENTS

| | | | |
|---|---|---|---|
| 4,651,155 A | 3/1987 | Baurle et al. | |
| 4,800,390 A | 1/1989 | Searle | |
| 5,504,783 A * | 4/1996 | Tomisato et al. | 375/267 |
| 5,515,378 A | 5/1996 | Roy, III et al. | |
| 5,519,735 A | 5/1996 | Rice et al. | |
| 5,546,090 A | 8/1996 | Roy, III et al. | |
| 5,574,989 A * | 11/1996 | Watson et al. | 455/101 |
| 5,592,490 A | 1/1997 | Barratt et al. | |
| 5,619,503 A | 4/1997 | Dent | |
| 5,625,880 A | 4/1997 | Goldburg et al. | |
| 5,642,353 A | 6/1997 | Roy, III et al. | |
| 5,694,416 A | 12/1997 | Johnson | |
| 5,828,658 A | 10/1998 | Ottersten et al. | |
| 5,886,988 A | 3/1999 | Yun et al. | |
| 5,894,473 A | 4/1999 | Dent | |
| 5,909,470 A | 6/1999 | Barratt | |
| 5,909,471 A | 6/1999 | Yun | |

(Continued)

OTHER PUBLICATIONS

Leabman, Michael A. *Adaptive band-partitioning of interference cancellation in communications systems*. M.Eng. Thesis, MIT EECS, 1997, pp. 1-70.

*Primary Examiner*—Simon Nguyen
(74) *Attorney, Agent, or Firm*—Steptoe & Johnson LLP

(57) ABSTRACT

A radio communication system includes a remote device radio, and a base station radio operable to communicate with the remote device radio at a first channel and at a second channel using non-simultaneous frequency diversity. The base station is operable to communicate with a device other than the remote device at the second channel while the remote device radio and the base station radio are communicating at the first channel. A radio using non-simultaneous frequency diversity includes an antenna, a radio frequency module coupled to the antenna such that the radio frequency module is operable to transmit or receive radio frequency signals at a first channel and signals at a second channel using the antenna, and a baseband module coupled to the radio frequency module. The baseband module operable to transmit or receive signals through the radio frequency module, such that signals transmitted or received by the radio employ non-simultaneous frequency diversity using the first channel and the second channel. Additional devices are operable to use the second channel while the radio is transmitting or receiving radio frequency signals at the first channel.

6 Claims, 7 Drawing Sheets

U.S. PATENT DOCUMENTS

| | | | |
|---|---|---|---|
| 5,930,243 A | 7/1999 | Parish et al. | |
| 5,933,421 A | 8/1999 | Alamouti et al. | |
| 5,955,992 A | 9/1999 | Shattil | |
| 5,973,642 A | 10/1999 | Li et al. | |
| 5,982,327 A | 11/1999 | Vook et al. | |
| 6,009,124 A | 12/1999 | Smith et al. | |
| 6,009,335 A | 12/1999 | Murphy | |
| 6,023,203 A | 2/2000 | Parish | |
| 6,037,898 A | 3/2000 | Parish et al. | |
| 6,047,189 A | 4/2000 | Yun et al. | |
| 6,122,260 A | 9/2000 | Liu et al. | |
| 6,128,276 A | 10/2000 | Agee | |
| 6,130,859 A | 10/2000 | Sonnenschein et al. | |
| 6,134,261 A | 10/2000 | Ryan | |
| 6,141,393 A | 10/2000 | Thomas et al. | |
| 6,141,542 A | 10/2000 | Kotzin et al. | |
| 6,141,567 A | 10/2000 | Youssefmir et al. | |
| 6,154,661 A | 11/2000 | Goldburg | |
| 6,173,005 B1* | 1/2001 | Kotzin et al. | 375/141 |
| 6,177,906 B1 | 1/2001 | Petrus | |
| 6,185,440 B1 | 2/2001 | Barratt et al. | |
| 6,240,098 B1 | 5/2001 | Thibault et al. | |
| 6,243,565 B1* | 6/2001 | Smith et al. | 455/101 |
| 6,266,528 B1 | 7/2001 | Farzaneh | |
| 6,275,543 B1 | 8/2001 | Petrus et al. | |
| 6,301,238 B1 | 10/2001 | Hagerman et al. | |
| 6,304,750 B1 | 10/2001 | Rashid-Farrokhi et al. | |
| 6,333,937 B1 | 12/2001 | Ryan | |
| 6,337,885 B1* | 1/2002 | Hellberg | 375/316 |
| 6,351,499 B1 | 2/2002 | Paulraj et al. | |
| 6,359,923 B1 | 3/2002 | Agee et al. | |
| 6,362,781 B1 | 3/2002 | Thomas et al. | |
| 6,369,758 B1 | 4/2002 | Zhang | |
| 6,370,182 B2 | 4/2002 | Bierly et al. | |
| 6,377,636 B1 | 4/2002 | Paulraj et al. | |
| 6,380,879 B2 | 4/2002 | Kober et al. | |
| 6,441,784 B1 | 8/2002 | Flore et al. | |
| 6,441,786 B1 | 8/2002 | Jasper et al. | |
| 6,445,342 B1 | 9/2002 | Thomas et al. | |
| 6,448,938 B1 | 9/2002 | Chiang et al. | |
| 6,459,171 B1 | 10/2002 | Leifer | |
| 6,463,295 B1 | 10/2002 | Yun | |
| 6,466,565 B1 | 10/2002 | Wax et al. | |
| 6,473,418 B1 | 10/2002 | Laroia et al. | |
| 6,477,161 B1 | 11/2002 | Hudson et al. | |
| 6,477,359 B2 | 11/2002 | Heppe et al. | |
| 6,480,522 B1 | 11/2002 | Hoole et al. | |
| 6,496,140 B1 | 12/2002 | Alastalo | |
| 6,496,535 B2 | 12/2002 | Xu | |
| 6,498,822 B1 | 12/2002 | Tanaka | |
| 6,504,506 B1 | 1/2003 | Thomas et al. | |
| 6,512,737 B1 | 1/2003 | Agee | |
| 6,539,209 B1* | 3/2003 | Dajer et al. | 455/101 |
| 6,549,151 B1 | 4/2003 | Kober et al. | |
| 6,553,019 B1 | 4/2003 | Laroia et al. | |
| 6,560,209 B1 | 5/2003 | Alamouti et al. | |
| 6,563,885 B1 | 5/2003 | Magee et al. | |
| 6,564,036 B1 | 5/2003 | Kasapi | |
| 6,570,527 B1 | 5/2003 | Lindskog et al. | |
| 6,584,144 B2 | 6/2003 | Alamouti et al. | |
| 6,587,514 B1 | 7/2003 | Wright et al. | |
| 6,598,014 B1 | 7/2003 | Rabideau et al. | |
| 6,600,776 B1 | 7/2003 | Alamouti et al. | |
| 6,600,914 B2 | 7/2003 | Uhlik et al. | |
| 6,603,806 B2 | 8/2003 | Martone | |
| 6,611,231 B2 | 8/2003 | Crilly, Jr. et al. | |
| 6,615,024 B1 | 9/2003 | Boros et al. | |
| 6,621,851 B1 | 9/2003 | Agee et al. | |
| 6,628,724 B2 | 9/2003 | Bannasch et al. | |
| 6,633,856 B2 | 10/2003 | Richardson et al. | |
| 6,639,541 B1 | 10/2003 | Quintana et al. | |
| 6,643,281 B1 | 11/2003 | Ryan | |
| 6,643,321 B1 | 11/2003 | Genossar et al. | |
| 6,647,015 B2 | 11/2003 | Malkemes et al. | |
| 6,647,078 B1 | 11/2003 | Thomas et al. | |
| 6,650,714 B2 | 11/2003 | Dogan et al. | |
| 6,650,881 B1 | 11/2003 | Dogan | |
| 6,651,210 B1 | 11/2003 | Trott et al. | |
| 6,654,590 B2 | 11/2003 | Boros et al. | |
| 6,662,024 B2 | 12/2003 | Walton et al. | |
| 6,665,285 B1 | 12/2003 | Treadaway et al. | |
| 6,668,161 B2 | 12/2003 | Boros et al. | |
| 6,680,699 B2 | 1/2004 | Voyer | |
| 6,683,915 B1 | 1/2004 | Trott et al. | |
| 6,684,366 B1 | 1/2004 | Trott et al. | |
| 6,686,879 B2 | 2/2004 | Shattil | |
| 6,687,492 B1 | 2/2004 | Sugar et al. | |
| 6,690,747 B2 | 2/2004 | Petrus et al. | |
| 6,694,147 B1 | 2/2004 | Viswanath et al. | |
| 6,697,436 B1 | 2/2004 | Wright et al. | |
| 6,711,120 B1 | 3/2004 | Laroia et al. | |
| 6,714,551 B1 | 3/2004 | Le-Ngoc | |
| 6,718,184 B1 | 4/2004 | Aiken et al. | |
| 6,728,554 B1 | 4/2004 | Wegner | |
| 6,731,689 B2 | 5/2004 | Dogan | |
| 6,731,705 B2 | 5/2004 | Kasapi et al. | |
| 6,731,710 B1 | 5/2004 | Genossar et al. | |
| 6,731,955 B2 | 5/2004 | Hirano et al. | |
| 6,735,258 B1 | 5/2004 | Trott et al. | |
| 6,735,427 B2 | 5/2004 | Higbie | |
| 6,738,020 B1 | 5/2004 | Lindskog et al. | |
| 6,747,594 B2 | 6/2004 | Lindskog et al. | |
| 6,751,444 B1 | 6/2004 | Meiyappan | |
| 6,757,546 B1 | 6/2004 | Hagen et al. | |
| 6,760,599 B1 | 7/2004 | Uhlik | |
| 6,768,747 B1 | 7/2004 | Dogan | |
| 6,771,986 B1 | 8/2004 | Oh | |
| 6,772,181 B1 | 8/2004 | Fu et al. | |
| 6,778,513 B2 | 8/2004 | Kasapi et al. | |
| 6,782,039 B2 | 8/2004 | Alamouti et al. | |
| 6,785,256 B2 | 8/2004 | O'Neill | |
| 6,785,300 B2 | 8/2004 | Hoole | |
| 6,785,513 B1 | 8/2004 | Sivaprakasam | |
| 6,785,520 B2 | 8/2004 | Sugar et al. | |
| 6,765,969 B1 | 9/2004 | Gray et al. | |
| 6,788,268 B2 | 9/2004 | Chiang et al. | |
| 6,788,270 B2 | 9/2004 | Suprunov et al. | |
| 6,788,948 B2 | 9/2004 | Lindskog et al. | |
| 6,788,963 B2 | 9/2004 | Laroia et al. | |
| 6,795,409 B1 | 9/2004 | Youssefmir et al. | |
| 6,795,413 B1 | 9/2004 | Uhlik | |
| 6,795,424 B1 | 9/2004 | Kapoor et al. | |
| 6,798,843 B1 | 9/2004 | Wright et al. | |
| 6,799,025 B1 | 9/2004 | Hoshino | |
| 6,801,589 B1 | 10/2004 | Dogan | |
| 6,802,038 B1 | 10/2004 | Yu | |
| 6,804,191 B2 | 10/2004 | Richardson | |
| 6,813,263 B1 | 11/2004 | Margherita | |
| 6,822,607 B2 | 11/2004 | Tanaka et al. | |
| 6,823,174 B1 | 11/2004 | Masenten et al. | |
| 6,823,180 B2 | 11/2004 | Reed et al. | |
| 6,826,240 B1 | 11/2004 | Thomas et al. | |
| 6,834,043 B1 | 12/2004 | Vook et al. | |
| 6,834,076 B2 | 12/2004 | Xu | |
| 6,834,249 B2 | 12/2004 | Orchard | |
| 6,836,673 B1 | 12/2004 | Trott | |
| 6,839,573 B1 | 1/2005 | Youssefmir et al. | |
| 6,839,574 B2 | 1/2005 | Petrus et al. | |
| 6,847,678 B2 | 1/2005 | Berezdivin et al. | |
| 6,847,809 B2 | 1/2005 | Gurelli et al. | |
| 6,850,740 B1* | 2/2005 | Haartsen | 455/101 |
| 6,850,741 B2 | 2/2005 | Lei et al. | |
| 6,853,629 B2 | 2/2005 | Alamouti et al. | |
| 6,853,839 B2 | 2/2005 | Usuda et al. | |

| | | | |
|---|---|---|---|
| 6,862,271 B2 | 3/2005 Medvedv et al. | 7,062,277 B2 * 6/2006 | Rudowicz ................ 455/452.1 |
| 6,862,446 B2 | 3/2005 O'Neill et al. | 7,095,709 B2 * 8/2006 | Walton et al. ............. 370/208 |
| 6,865,377 B1 | 3/2005 Lindskog et al. | 7,103,340 B2 * 9/2006 | Spencer et al. ............. 455/272 |
| 6,870,808 B1 | 3/2005 Liu et al. | 2001/0019592 A1 * 9/2001 | Solondz ..................... 375/267 |
| 6,873,293 B2 | 3/2005 Proctor, Jr. et al. | 2004/0071222 A1 * 4/2004 | Liang et al. ................ 375/267 |
| 6,873,651 B2 | 3/2005 Tesfai et al. | 2004/0087282 A1 * 5/2004 | Ishikawa .................... 455/101 |
| 6,873,831 B2 | 3/2005 Attar et al. | 2005/0009476 A1 * 1/2005 | Wu et al. ................... 455/101 |
| 6,874,006 B1 | 3/2005 Fu et al. | 2005/0159115 A1 * 7/2005 | Sandhu ....................... 455/101 |
| 6,876,623 B1 | 4/2005 Lou et al. | | |
| 7,020,072 B1 * | 3/2006 Li et al. ..................... 370/208 | * cited by examiner | |

Simultaneous Frequency Diversity

Non-Simultaneous Frequency Diversity

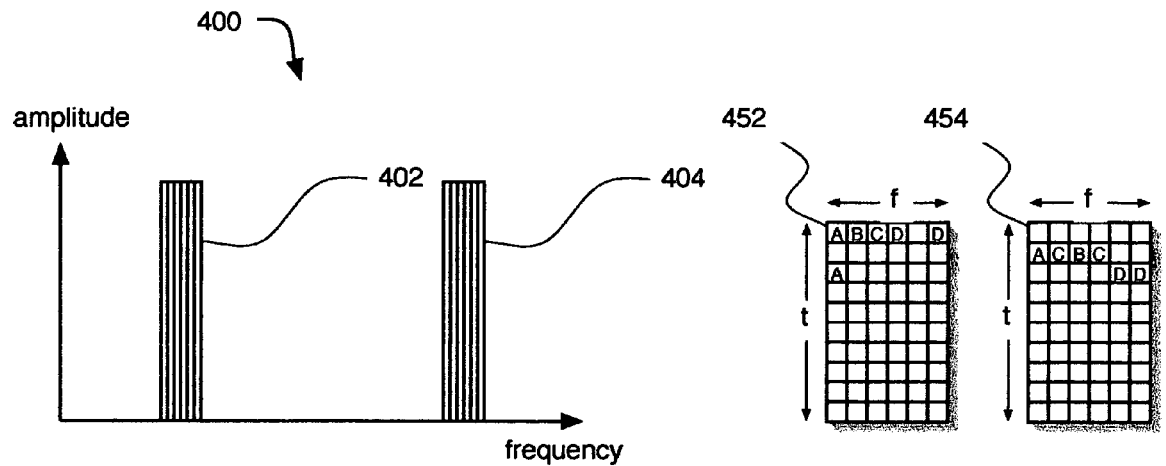
FIG. 4A  FIG. 4B
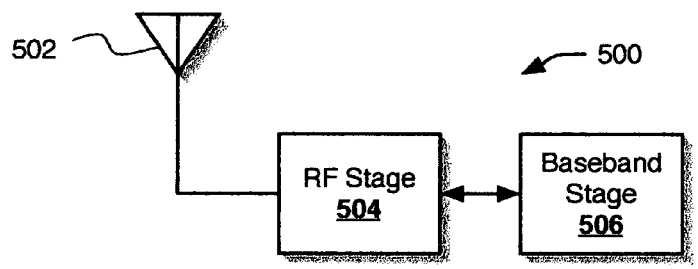
FIG. 5A
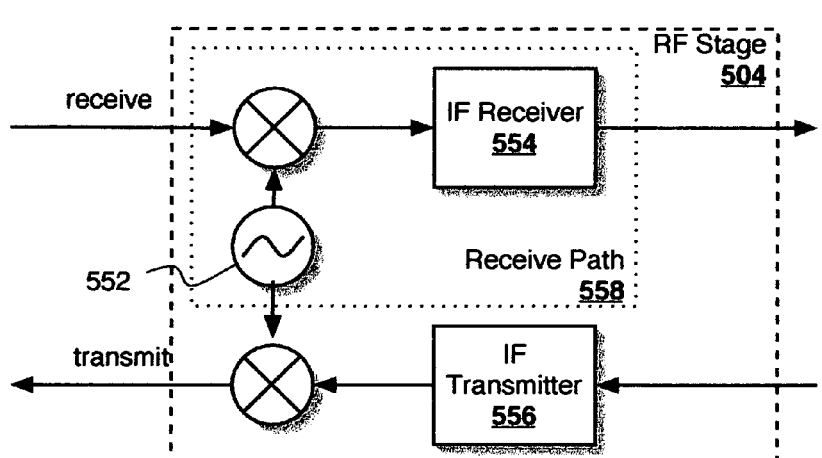
FIG. 5B

Multi-Connection, Non-Simultaneous Frequency Diversity

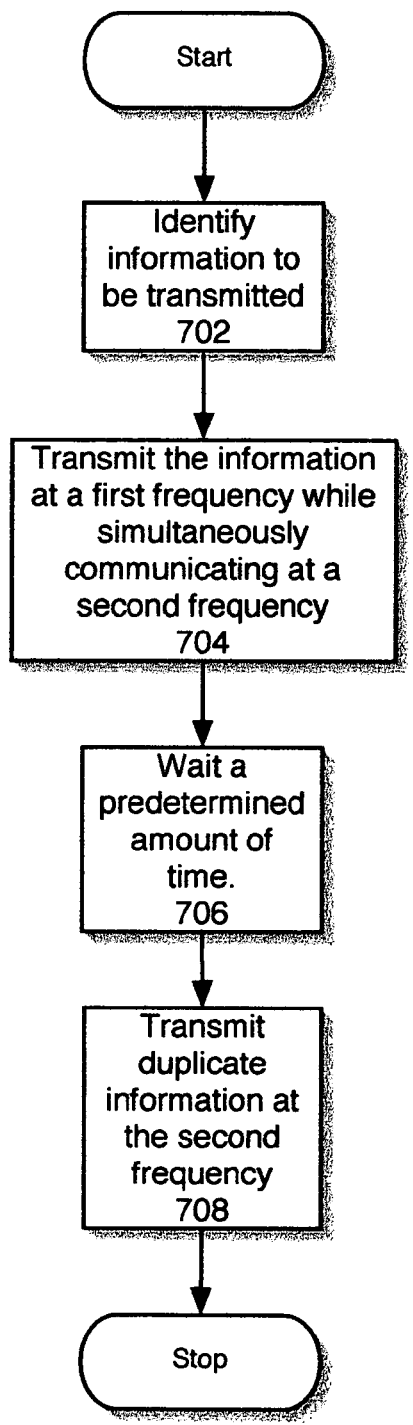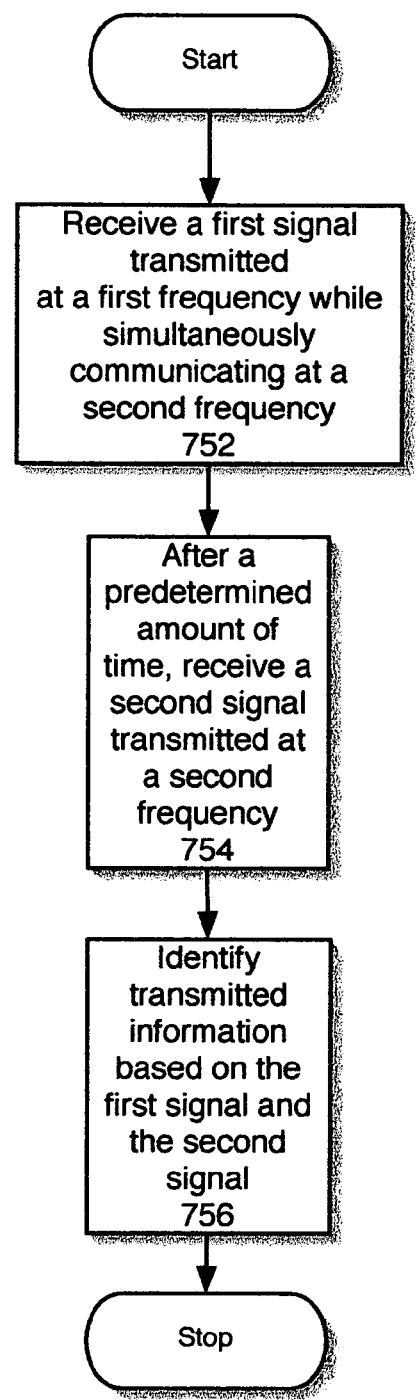
FIG. 7A
FIG. 7B

MULTI-CONNECTION, NON-SIMULTANEOUS FREQUENCY DIVERSITY IN RADIO COMMUNICATION SYSTEMS

CROSS-REFERENCE TO RELATED APPLICATION

This application is related to co-pending U.S. application Ser. No. 10/893,821 titled "NON-SIMULTANEOUS FREQUENCY DIVERSITY IN RADIO COMMUNICATION SYSTEMS" and filed concurrently herewith, which is hereby incorporated by reference in its entirety for all purposes.

TECHNICAL FIELD

This disclosure is directed to a radio communication system and, more particularly, to the use of diversity techniques to improve the performance of radio communications in a multi-connection environment.

BACKGROUND

In radio communication systems, such as, for example, mobile telephone systems and wireless networks, signals propagate through communication channels that are affected by a variety of factors including: atmosphere, man-made structures, terrain, fauna, and radio interference. As signals encounter man-made and natural objects, they may be reflected, refracted, and/or diffracted, resulting in changes in amplitude, phase, and frequency. To confound matters, a signal may reach a receiver through multiple paths, undergoing different distortions along each path. With differing phases and amplitudes, the multipath signals may interfere with one another, further degrading signal quality. Signal attenuation caused by multipath interference or interactions with man-made and natural object is called fading. A deep fade occurs when signal power drops so low as to prevent communications.

Because propagation channels are ever changing, fading is time dependent. Because the effects of reflection, refraction, and diffraction are frequency dependent, fading also is frequency dependent. One solution to the problem of fading is the use of diversity techniques—transmitting duplicate information such that the probability of fading disrupting signal reception is reduced.

Frequency diversity is sometimes used to reduce the likelihood of deep fade. Taking advantage of the frequency-dependent nature of fading, duplicate information is transmitted at different frequencies. As long as both frequency components are not in deep fade, communications can occur.

Time diversity also is used to reduce the likelihood of deep fade. By transmitting duplicate information at a later time, the information is more likely to be received because channel fading likely to differ. To maximize the effectiveness of time diversity, duplicate information should be transmitted after sufficient delay such that the fading characteristics of the communications channel have sufficient time to change.

Additional diversity techniques include path diversity and polarization diversity. By exploiting one or more diversity techniques, modem radio communication systems can significantly mitigate fading.

SUMMARY

In one general aspect, a radio communication system includes a remote device radio, and a base station radio operable to communicate with the remote device radio at a first channel and at a second channel using non-simultaneous frequency diversity. The base station is operable to communicate with a device other than the remote device at the second channel while the remote device radio and the base station radio are communicating at the first channel.

In some implementations, the remote device radio is a subscriber station in a wireless network and the base station radio is a base station in a wireless network. The system also may include a second remote device radio such that the base station radio is operable to communicate with the remote device radio at the first channel while communicating with the second remote device radio at the second channel. The remote device radio may include a single transmit/receive path.

Additionally, the radio communication system includes two communication channels with a frequency separation to facilitate non-simultaneous frequency diversity (e.g., a frequency separation of over 20 MHz). The information transmitted on the first and second channels may differ by a complex gain. The first transmission channel and the second transmission channel may be wideband channels.

In another general aspect, a radio using non-simultaneous frequency diversity includes an antenna, a radio frequency module coupled to the antenna such that the radio frequency module is operable to transmit or receive radio frequency signals at a first channel and signals at a second channel using the antenna, and a baseband module coupled to the radio frequency module. The baseband module operable to transmit or receive signals through the radio frequency module, such that signals transmitted or received by the radio employ non-simultaneous frequency diversity using the first channel and the second channel. Additional devices are operable to use the second channel while the radio is transmitting or receiving radio frequency signals at the first channel.

In some implementations, the radio includes a second antenna coupled to the radio frequency module. The radio frequency module may be implemented using a local oscillator operable to generate a signal, an intermediate frequency receiver, an intermediate frequency transmitter, a receive mixer coupled to the intermediate frequency receiver and the local oscillator, and a transmit mixer coupled to the intermediate frequency transmitter and the local oscillator. The receive mixer and the transmit mixer convert signals between an intermediate frequency and a transmission frequency using the local oscillator signal. In other implementations, a zero-if mixer may be employed to convert signals from baseband frequencies to transmission frequencies using a local oscillator.

Additionally, the radio may be operable to transmit data using non-simultaneous frequency diversity by using the local oscillator to transmit data at a first frequency and by using the local oscillator to transmit data at a second frequency. In some implementations, it may be desirable for the receive mixer, the local oscillator, and the intermediate frequency receiver to form a receive path such that the radio employs non-simultaneous frequency diversity using a single receive path. Alternatively, the radio may further include a second local oscillator such that the radio is operable to transmit data using non-simultaneous frequency diversity by using the local oscillator to transmit data at a first frequency and by using the second local oscillator to transmit data at a second frequency. The baseband module may use orthogonal frequency division multiplexing (OFDM).

In another general aspect, a method for transmitting information using non-simultaneous frequency diversity includes identifying information to be transmitted to a first device, transmitting the identified information to the first device on a first channel while simultaneously communicating with a second device on the second channel, and, after a predetermined amount of time, transmitting the identified information on a second channel.

In some implementations, identifying information to be transmitted includes identifying a block to be transmitted from a set of information to be transmitted. The block includes no more than the maximum amount of information that can be transmitted at one time. For example, the size of the block may be based on the size of an orthogonal frequency division multiplexing (OFDM) tone.

The identified information may be transmitted at the first or second frequencies by mixing an intermediate frequency signal with the output from a local oscillator to convert the intermediate frequency signal to the transmission frequency. The same local oscillator may be used for both. In addition, the predetermined amount of time between transmissions may be fixed or dynamic. The radio may be configured to transmit signals on the first transmission channel and to transmit signals on the second transmission channel at consecutive points in time.

In another general aspect, a method for receiving information transmitted using non-simultaneous frequency diversity includes receiving a first signal transmitted by a first device on a first channel while simultaneously communicating with a second device on a second channel, receiving a second signal transmitted by the first device on the second channel after a predetermined amount of time, and identifying transmitted information based on the first signal and the second signal.

In some implementations, the method further includes converting the first signal to an intermediate frequency using a signal from a local oscillator, and converting the second signal to an intermediate frequency using a signal from a local oscillator. The same local oscillator may be used to convert both the first signal and the second signal. The amount of time between reception of the first signal and the second signal may be fixed or dynamic.

Implementations may include using a single receive path to receive the first signal transmitted on the first channel and to receive the second signal transmitted on a second channel. The first channel and the second channel may be wideband channel, and the first channel and the second channel differ by at least 20 MHz.

The system may identify the transmitted information by combining the first signal and the second signal using selection diversity, equal gain combining, and/or maximal ratio combining.

In another general aspect, a method for receiving information transmitted using non-simultaneous frequency diversity includes receiving a first signal transmitted by a first device on a first channel while a second device communicates on a second channel, receiving a second signal transmitted by the first device on the second channel after a predetermined amount of time, and identifying transmitted information based on the first signal and the second signal. The first device may be a base station in a wireless network such that a transmission from the first device is received while the second device communicates with the first device.

The details of one or more implementations are set forth in the accompanying drawings and the description below. Other features and advantages will be apparent from the description and drawings, and from the claims.

DESCRIPTION OF DRAWINGS

FIG. 4A is an amplitude-versus-frequency plot of a radio communication system transmission using orthogonal frequency division multiplexing (OFDM).

FIG. 4B is a block diagram of OFDM transmissions at various points in time illustrating non-simultaneous frequency diversity.

FIG. 5A is a block diagram of a radio using non-simultaneous frequency diversity.

FIG. 5B is a block diagram of the radio frequency (RF) stage of a radio using non-simultaneous frequency diversity.

FIG. 7A is a flow chart of a method of transmitting information using non-simultaneous frequency diversity.

FIGS. 7B and 7C are flow charts of methods of receiving information transmitted using non-simultaneous frequency diversity.

DETAILED DESCRIPTION

Figure 1:
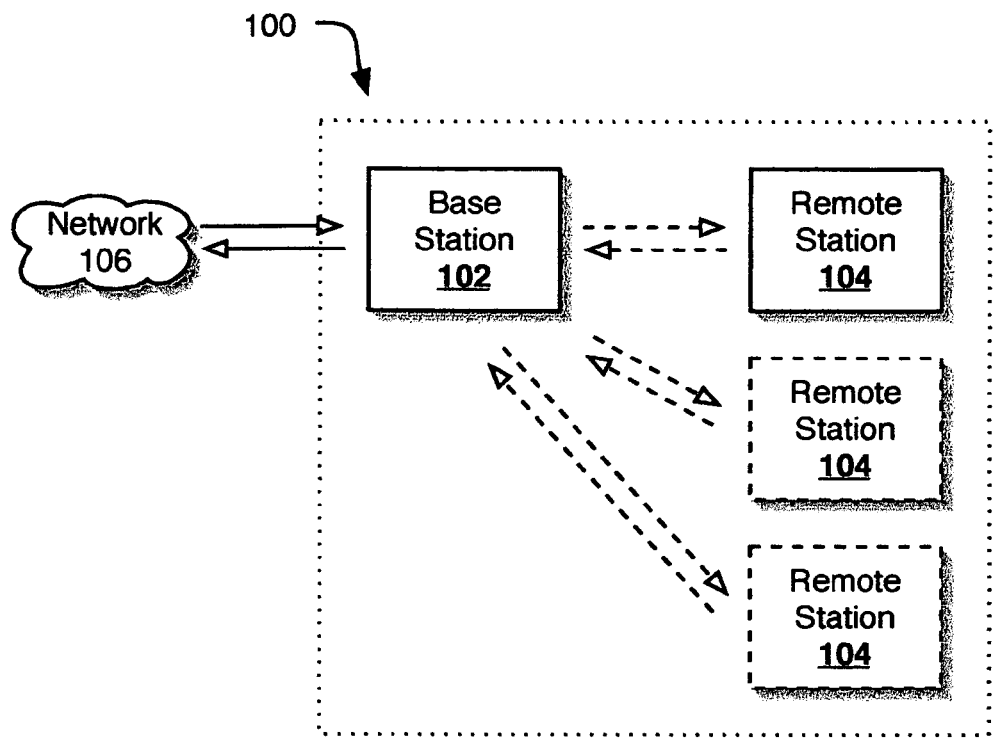
FIG. 1 is a diagram of a radio communication system.

Referring to FIG. 1, a radio communication system 100 comprises a base station 102 operable to communicate with multiple remote stations 104. The base station 102 is coupled to a network 106 such that the base station 102 can transfer information between the network 106 and the remote stations 104. The radio communication system 100 may be used to provide wireless services, such as, for example, wireless metropolitan area networks, wireless local area networks, wireless video-on-demand, and/or wireless voice services.

For example, the radio communication system 100 may be used to implement a wireless local area network (WLAN) based on the IEEE 802.11 standard. In this implementation, the base station 102 serves as an access point or as a router, connecting one or more remote stations 104 to a network 106, which can be a local area network (LAN) or a wide area network (WAN), such as the Internet. The remote stations 104 typically are laptop or desktop computers configured with wireless network interface cards.

The base station 102 is a hardware device that facilitates radio frequency (RF) communications with remote stations 104. The RF communications is typically two-way (with the base station 102 and remote station 104 transmitting and receiving information from one another); however, the non-simultaneous frequency diversity techniques described herein may also be used with one-way RF communications, such as, for example, a video or information broadcast system, or a pager system.

To facilitate two-way RF communications, the base station 102 includes at least one antenna and a signal processing unit. The signal processing unit typically includes components to filter and amplify signals, to convert signals between analog and digital, and to interpret and process received data.

The base station 102 and remote stations 104 may be implemented using conventional electronic design and manufacturing techniques using application-specific integrated circuits and/or commercial off-the-shelf components. Portions of the implementations may be carried out in software-configured digital signal processors (DSPs) or general-purpose microprocessors.

To improve performance, a variety of diversity techniques may be employed including frequency diversity. According to the *Glossary of Telecommunication Terms* (Federal Standard 1037 (2000)), frequency diversity is "transmission and reception in which the same information signal is transmitted simultaneously on two or more independently fading carrier frequencies." Because fading typically is frequency-dependent, frequencies near one another are not likely to fade independently. For this reason, it is useful to choose two or more disparate carrier frequencies. However, using disparate carrier frequencies may increase implementation expense and complexity.

Figure 2:
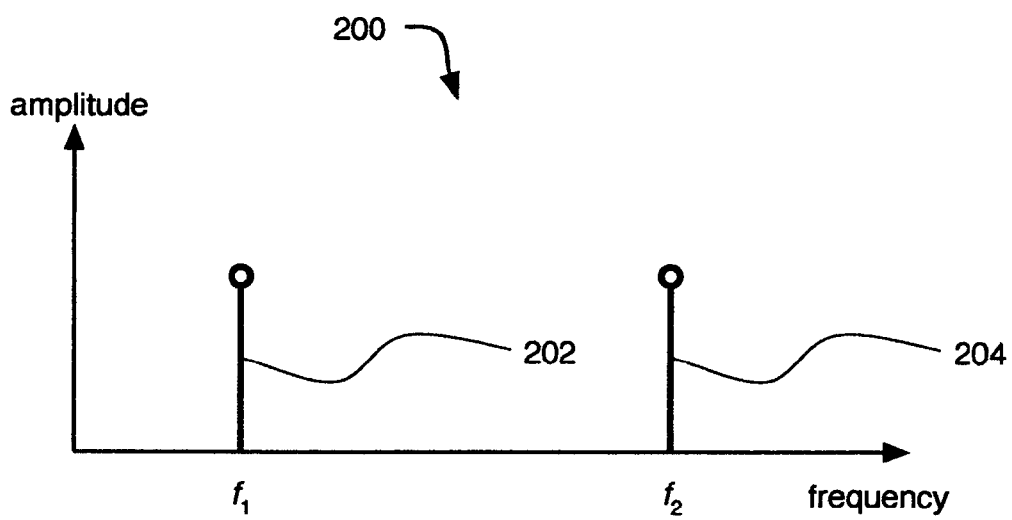
FIG. 2 is an amplitude-versus-frequency plot of a radio communication system transmission using simultaneous frequency diversity.

Referring to FIG. 2, a radio communication system 100 employing simultaneous frequency diversity transmits duplicate information on multiple carriers. For example, data to be sent by a base station 102 to a remote station 104 is transmitted at a first frequency $f_1$ (signal 202) and at a second frequency $f_2$ (signal 204). The two frequencies $f_1$ and $f_2$ should be chosen such that they fade independently. For example, frequencies $f_1$ and $f_2$ can be chosen to be greater than 20 MHz apart so that the likelihood of both channels fading simultaneously is reduced. The frequency separation is implementation-dependent and is affected by a variety of technical and regulatory factors.

In most radio communication systems 100, signals are processed at lower frequencies than their transmission frequencies, decoupling signal processing from transmission. A local oscillator (LO) may be used to generate a signal that is mixed with a data signal to raise its frequency to the transmission frequency. If signals 202 and 204 are too far apart, two LOs may be used with one LO used to generate signal 202 and a second LO to generate signal 204.

So that a remote station 104 does not require simultaneous reception of signals 202 and 204, duplicate information may be transmitted on two or more independently fading carrier frequencies at different points in time. By transmitting signal 202, waiting a period of time, and then transmitting signal 204 at a second frequency, a radio communication system 100 may employ non-simultaneous frequency diversity such that only a single receive path is required, thereby reducing the complexity and expense of both the base station 102 and the remote stations 104.

Figure 3A:
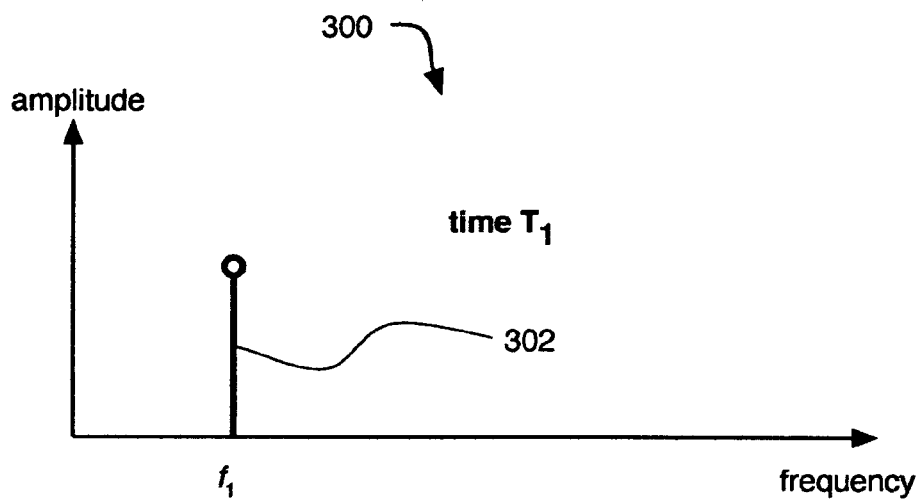
FIGS. 3A and 3B are amplitude-versus-frequency plots of radio communication system transmissions using non-simultaneous frequency diversity.
Figure 3B:
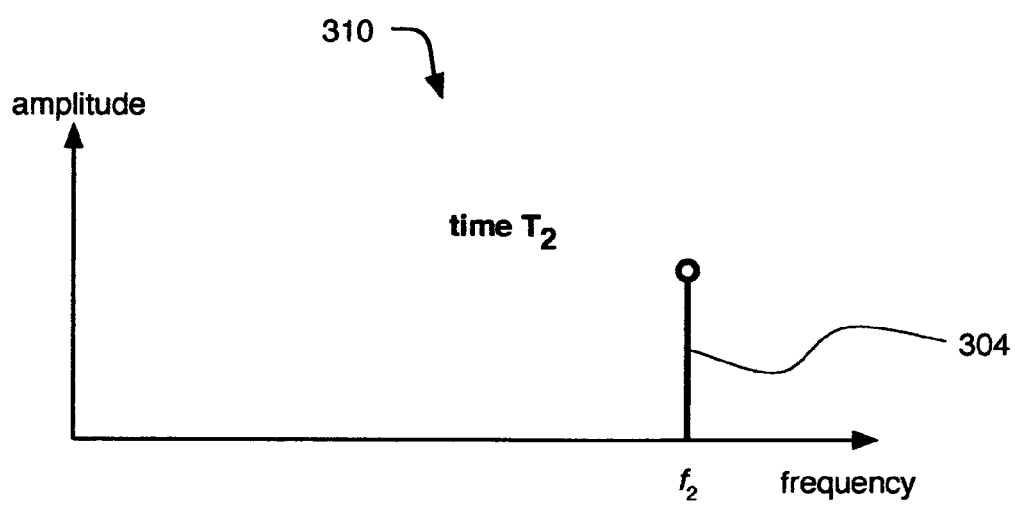

Referring to FIGS. 3A and 3B, a radio communication system 100 using non-simultaneous frequency diversity transmits a signal 302 at a first frequency $f_1$ at time $T_1$ and then transmits a signal 304 containing duplicate information at a second frequency $f_2$ at time $T_2$. These figures only show the amplitude and frequency components of signals 302 and 304; however, they also may include a phase component.

The signal 304 duplicates at least some of the information included in signal 302; however, the information may be encoded differently so that the signals 302 and 304 do not have identical amplitudes and phases.

By transmitting duplicate information at different frequencies, non-simultaneous frequency diversity provides many of the benefits of simultaneous frequency diversity without necessitating simultaneous reception. When changing transmission and reception frequencies, some delay is needed to allow the frequency adjustments to settle. The time elapsed between $T_1$ and $T_2$ is predetermined and may be based on the needed delay.

In the examples described above, information is transmitted twice to implement non-simultaneous frequency diversity. However, the information may be transmitted any number of times. Additional redundant transmissions may further improve performance at the expense of bandwidth.

Redundant information may be simply retransmitted, or the radio communication system 100 may apply a complex gain, varying the phase and/or amplitude of the redundant signals. A receiving device may combine the two or more received transmissions, possibly resulting in signal gain.

Figure 3C:
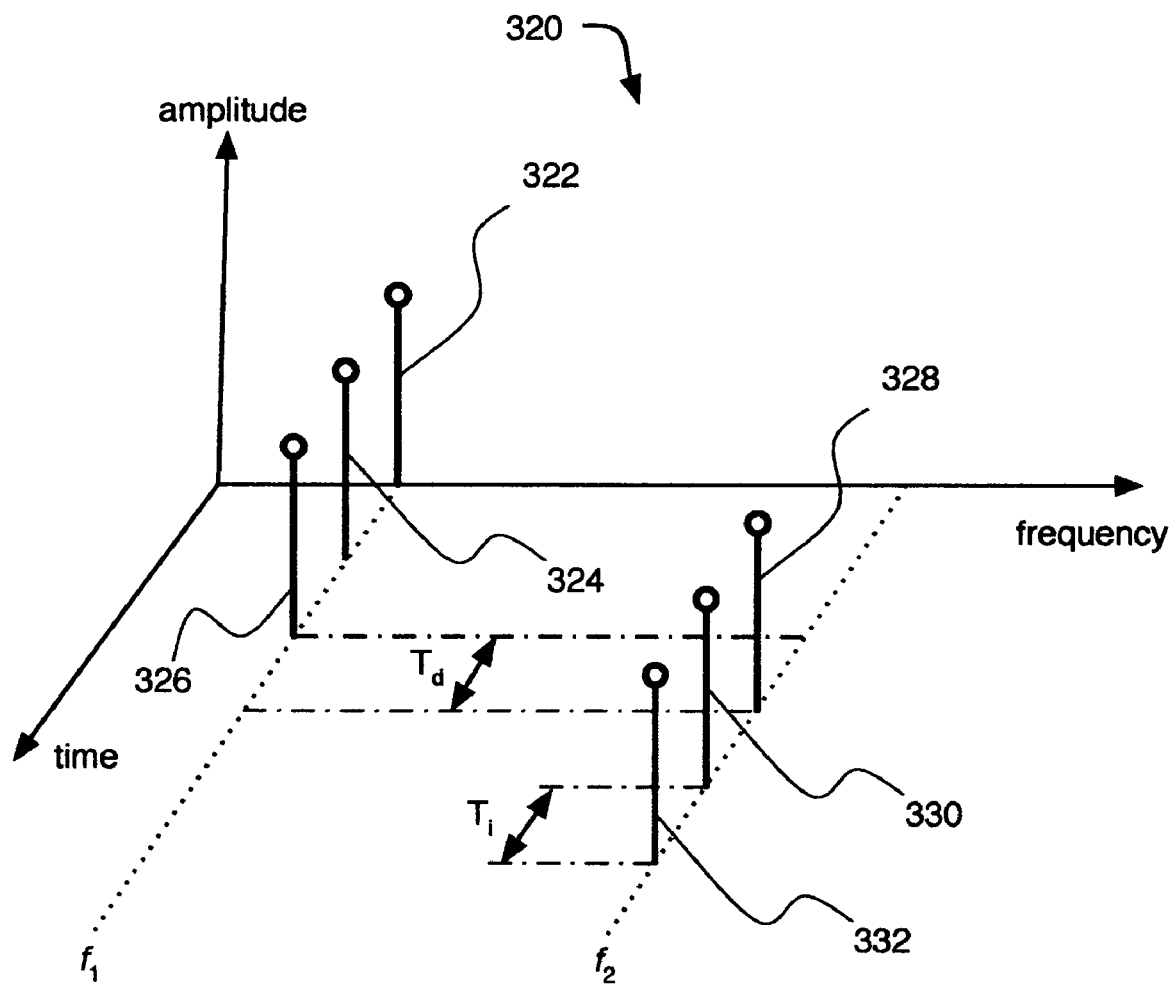
FIG. 3C is an amplitude-frequency-time graph of a series of transmissions using non-simultaneous frequency diversity.

Referring to FIG. 3C, if significant delay is needed between frequency changes, it may be advantageous to transmit multiple signals at the first frequency $f_1$ with a short delay $T_i$ between transmissions and then transmit duplicate information at the second frequency $f_2$ after a delay $T_d$. Any values may be chosen for delays $T_i$ and $T_d$; however, less time is usually needed between transmissions at a single frequency or at nearby frequencies, so $T_i$ is typically smaller than $T_d$. In this example, three signals 322, 324, and 326 are sequentially transmitted at frequency $f_1$. Then, after a delay $T_d$, three signals 328, 330, and 332 are sequentially transmitted at a second frequency $f_2$.

The examples of non-simultaneous frequency diversity described above illustrate the technique in a single-carrier transmission. Some modern communication systems employ multiple-carrier technology, such as, for example, spread spectrum, frequency division multiplexing, and orthogonal frequency division multiplexing (OFDM). Instead of transmitting a signal modulated at a single carrier frequency, a multi-carrier transmission system sends a signal across a wider communication channel, with portions of the signal modulated at various sub-carrier frequencies.

For example, an OFDM communication system transmits an information stream across a wideband channel (e.g., 20 MHz channel) that is divided into many narrow sub-channels. The information stream is broken into blocks such that multiple blocks may be modulated at various sub-carrier frequencies and transmitted across the sub-channels. Each block transmitted at a sub-carrier frequency is called a tone. For example, the IEEE 802.16 standard provides for an OFDM implementation using a wideband channel having many as 2048 tones.

In a multi-carrier system, a transmitted signal spans multiple frequencies. To implement non-simultaneous frequency diversity in a multi-carrier system, information transmitted in a first signal (e.g., one or more tones from an OFDM transmission) is transmitted in a second signal at a later point in time. The information may be encoded differently from the first transmission to the second transmission. For example, the system may apply a complex gain, rearrange portions of the information, or otherwise transform the information such that a receiving system can recover the transmitted information from one or more of the received signals. Because OFDM signals span multiple frequencies, duplicate information may be transmitted on different tones (i.e., modulated at a different sub-carrier frequency) and/or transmitted on different channels (i.e., modulated to a frequency outside the wideband channel of the first transmission).

Referring to FIG. 4A, a transmitted OFDM channel 402 includes multiple blocks of data spread across a range of frequencies (i.e., tones). The OFDM system may be extended to incorporate frequency diversity techniques by transmitting duplicate information in a second OFDM channel 404. If the second OFDM channel 404 is transmitted at a second point in time, then the radio communication system employs non-simultaneous frequency diversity.

Referring to FIG. 4B, an OFDM radio communication system transmits multiple blocks of data simultaneously across multiple frequencies. Diagrams 452 and 454 show tones in an OFDM system transmitted at differing points in time. Diagram 452 shows data transmitted at a first range of frequencies and diagram 454 shows data transmitted at a second range of frequencies. In this example, a first OFDM signal is broadcast including information "A", "B", "C", and "D", with "D" transmitted in duplicate. At a later point in time, a second OFDM signal is broadcast at a second range of frequencies containing the information "A", "B", "C", and "D" with "C" and "D" duplicated. The information "A" is transmitted at corresponding tones within the channel (i.e., at the first data tone of each channel). The information "B" is retransmitted at a different relative location within the channel. The information "C" is transmitted in duplicate (using two separate tones) in the second channel. The information "D" is transmitted in duplicate in both the first and the second channels. Finally, a third OFDM signal is broadcast using the first channel with the information "A". The information may be transmitted any number of times and the system may encode each transmission in a different way (i.e., the system may apply a complex gain or otherwise transform duplicate information).

FIG. 4B shows that non-simultaneous frequency diversity may be implemented in a variety of ways such as, for example, the following: (1) duplicate information transmitted at corresponding frequencies at consecutive points in time (e.g., "A"); (2) multiple copies of duplicate information (e.g., "A", "C", and "D"); (3) duplicate information transmitted at non-consecutive points in time (e.g., "D"); and (4) information duplicated within a single channel (e.g., "D" and the second transmission of "C").

Referring to FIG. 5A, an implementation of a radio communication system 100 using non-simultaneous frequency diversity is built using a radio 500 for the base station 102 and remote stations 104. The radio 500 includes an antenna 502 for receiving and/or transmitting RF signals, a radio frequency (RF) stage 504 for converting signals between transmission frequency and baseband frequency, and a baseband stage 506.

The antenna 502 may be implemented using any conventional technology, such as, for example, a quarter-wave omni-directional antenna. The radio 500 may use a single antenna for transmission and reception, or it may use multiple antennas to improve performance using beam forming and/or antenna diversity.

In this implementation, signals are processed in software by the baseband stage 506. The baseband stage 506 includes one or more integrated circuits, such as, for example, a digital signal processor (DSP), to implement application logic. In a networking application, the DSP implements the physical layer (PHY), the media access control layer (MAC), and the network layer functions, such as, modulation/demodulation, coding/decoding, and traffic scheduling. The baseband stage 506 also may include components to support wireline (e.g., 10/100 Base T), wireless (e.g., 802.11 g), phoneline (e.g., HomePNA), and/or powerline interfaces.

The RF stage 504 includes components to convert signals from transmission frequencies to baseband frequencies and vice versa. The RF stage 506 also provides analog-to-digital converters and digital-to-analog converters so that signals processed by the baseband stage 506 are digital.

Referring to FIG. 5B, the RF stage 504 may be implemented using a local oscillator (LO) 552, an intermediate frequency (IF) receiver 554, and an IF transmitter 556. The LO 552 converts signals between transmission frequency and intermediate frequency which are used by the IF receiver 554 and the IF transmitter 556. The IF receiver 554 takes the received signal after it has been converted to IF and generates signals for processing by the baseband stage 506. The baseband stage 506 sends signals for transmission to the IF transmitter 556 in the RF stage. The IF transmitter 556 generates a transmission signal at the intermediate frequency, which is mixed with a signal from the LO 552 to convert the signal to transmission frequency.

The local oscillator 552 and IF receiver 554 make up a receive path 558. Because the radio 500 uses non-simultaneous frequency diversity, only a single receive path is needed. To transmit information at two frequencies, the IF transmitter 556 provides an RF signal that is mixed with a signal from the LO 552 to convert the signal to a first transmission frequency. Then, the LO 552 may be used to produce a second signal to convert the same IF transmitter 556 signal to a second transmission frequency. Because the transmissions do not occur simultaneously, multiple IF transmitters 556 are not needed and the signal may be received using a single IF receiver 554 in a single receive path 558. The implementation shown in FIG. 5B is included to illustrate the receive path 558 benefits of non-simultaneous frequency diversity. In practice, additional components would be included, such as, for example, various filters, amplifiers, and logic.

If the first and second transmission frequencies vary greatly, the local oscillator 552 may take too much time to settle. One solution is to use multiple local oscillators 552 with logic provided to select the appropriate LO 552 signal for a particular transmission or reception. Using two LOs 552, a radio 500 may down-convert a first transmission using the signal from one LO 552 and down-convert a second transmission using the signal from another LO 552. In this manner, the IF receiver 554 and the same receive path 558 may be used to provide frequency diversity.

Figure 6A:
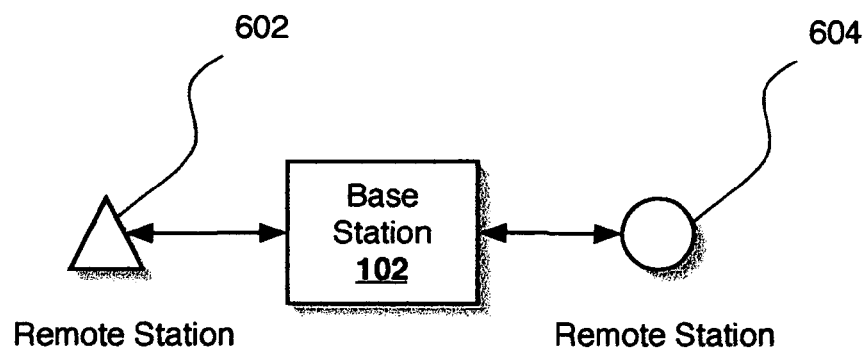
FIG. 6A is a block diagram of a multi-connection system using non-simultaneous frequency diversity.

Referring to FIG. 6A, the techniques described above may be used build radios employing frequency diversity with a single transmit/receive path. However, as shown in FIGS. 3A through 3C, this results in some wasted bandwidth as nothing is transmitted at frequency $f_2$ while information is transmitted at frequency $f_1$ and vice versa. To make better use of available bandwidth while employing non-simultaneous frequency diversity, a base station 102 may be configured to simultaneously transmit to multiple remote stations 104. For example, FIG. 6A shows a base station 102 that is operable to transmit to remote stations 602 (designated by a triangle) and 604 (designated by a circle).

Figure 6B:
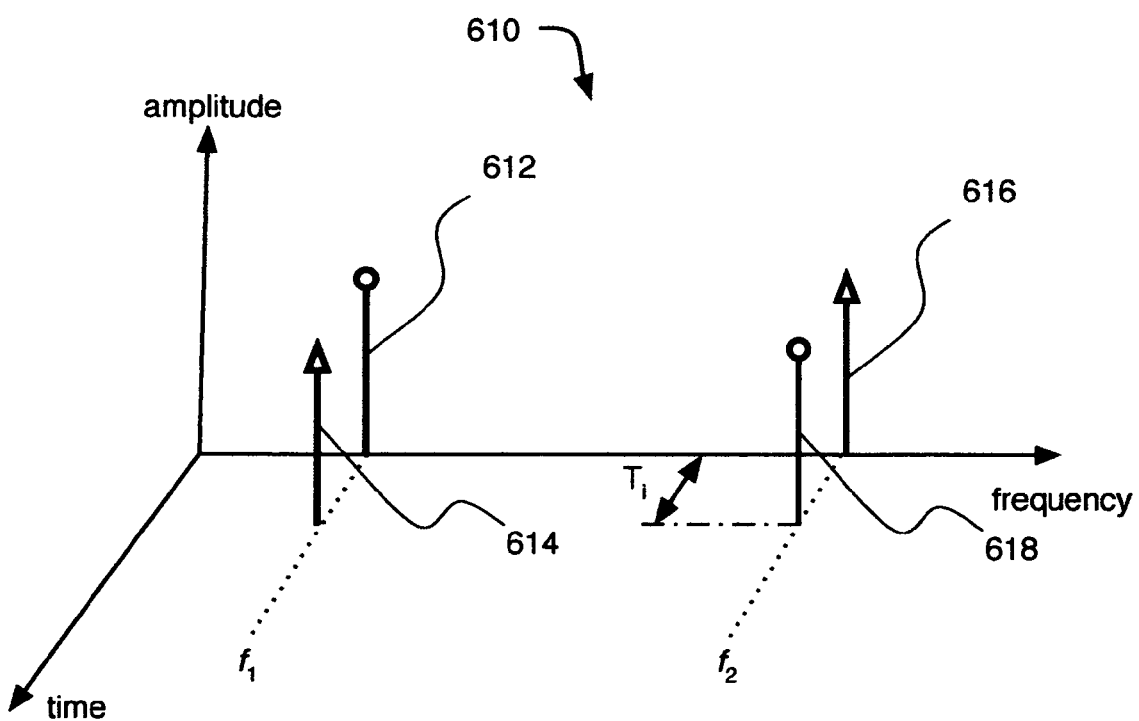
FIG. 6B is an amplitude-frequency-time plot of a multi-connection radio communication system transmission using non-simultaneous frequency diversity.

Referring to FIG. 6B, the base station 102 when using non-simultaneous frequency diversity to communicate with remote station 602 transmits information at a first frequency $f_1$ and then transmits information at a second frequency $f_2$. While the base station 102 is transmitting to remote station 602 at the first frequency $f_1$, the base station 102 may simultaneously transmit information to another remote station, such as, for example, second remote station 604, at another frequency (e.g., frequency $f_2$). Similarly, while the base station 102 transmits to the second remote station 604 at frequency $f_1$, the base station 102 may transmit to another remote station 104 using frequency $f_2$. FIG. 6B shows information transmitted at frequencies $f_1$ and $f_2$ at different points in time. Signals 612, 614, 616, and 618 are each shown with a circle or triangle corresponding to remote stations 602 and 604 discussed above with respect to FIG. 6A. At a first point in time, a signal 612 between the base station 102 and the second remote station 604 (i.e., circle) is transmitted at frequency $f_1$ while a signal 616 between the base station 102 and remote station 602 (i.e., triangle) is simultaneously transmitted at frequency $f_2$. After time $T_i$, the frequency use is reversed with a signal 614 between the base station 102 and remote station 602 (i.e., triangle) is transmitted at frequency $f_1$ while a signal 618 between the base station 102 and remote station 604 (i.e., circle) is simultaneously transmitted at frequency $f_2$. This technique may be employed to make better use of available bandwidth with non-simultaneous frequency diversity.

In the example discussed above, a base station 102 simultaneously communicates with remote stations 602 and 604. A remote station 104 using non-simultaneous frequency diversity communicates with the base station 102 using at least two frequencies and the remote station 104 does not simultaneously send and/or receive at the two frequencies. Instead allowing bandwidth to go unused, the base station 102 makes use of the otherwise idle bandwidth to communicate with another device. In this example, the base station 102 uses the two frequencies to communicate with two devices; however, this frequency may be used in a wide variety of ways.

For example, a group of n devices may be assigned to share a group of f frequencies. For each point in time, the frequencies are allocated among some or all of the devices such that each device is able to determine when to transmit and/or receive at a particular frequency. This becomes a standard communication scheduling problem. It may be desirable to equitably allocate frequency usage to each of the n devices or it may be desirable to prioritize based on the device and/or the content or type of the communications. Any scheduling techniques may be used allocate the available bandwidth such that devices may employ non-simultaneous frequency diversity.

In one implementation, a group of 4 devices (A, B, C, and D) share 3 frequencies (1, 2, and 3). For example, device A may communicate at frequency 1 (i.e., A1) while device B communicates at frequency 2 (i.e., B2). Bandwidth utilization is scheduled such that each device gets an equal portion of the available bandwidth. Table T1 below shows bandwidth scheduling at various points in time.

TABLE 1

| Time | Schedule |
|------|----------|
| 1 | A1,B2,C3 |
| 2 | B1,C2,D3 |
| 3 | C1,D2,A3 |
| 4 | D1,A2,B3 |

Any alternative scheduling could be used; however, using the schedule shown in Table 1, each of the remote devices A, B, C, and D need only a single transmit/receive path. The base station 102, on the other hand, may use multiple transmit/receive paths to support three simultaneous communications at frequencies 1, 2, and 3. It should be understood that frequencies 1, 2, and 3 may each constitute a single frequency, or they may each include a range of frequencies for multi-carrier transmissions. Both transmit and receive times typically are scheduled. For example, a base station 102 communicating at two simultaneous frequencies may simultaneously transmit, simultaneously receive, or may transmit at one frequency while receiving at another.

Referring to FIG. 7A, a base station 102 may transmit multi-connection signals using non-simultaneous frequency diversity by first identifying a first piece of information the information to be transmitted (702). In a network implementation, the data link layer breaks information into frames for transmission across the physical layer. In this implementation, the information to be transmitted includes a single frame. The size of a frame may be dependent on link quality—if link quality is high, more information may be transmitted at each frequency; however, as link quality degrades, less and less information may be differentiated in a received signal. The information is then transmitted at a first frequency (704) while the base station simultaneously communicates at a second frequency. This simultaneous communication may include transmitting to another remote device 104 at the second frequency and/or receiving from another remote device 104 at the second frequency.

The system then waits a predetermined amount of time before transmitting duplicate information (706). The amount of time to wait may be fixed or dynamic. If the wait time is fixed, it is best to choose the least amount of time such that the system can transmit at a different frequency. After a predetermined amount of time (706), the system transmits duplicate information at the second frequency (708). The duplicate information may be identical to the information initially transmitted, or it may be encoded differently. Any coding techniques may be used so long as the receiving device is able to obtain the transmitted information from both the first and the second transmissions (if both are received correctly). While transmitting at the second frequency, the base station 102 also may communicate with another remote device 104 by transmitting or receiving information at another frequency (e.g., at the first frequency).

In a broadband wireless implementation, multiple base stations 102 are distributed through a service area. These base stations and their antennas may be placed, for example, on towers, utility poles, or buildings. Throughout the service area, customers may install subscriber stations (remote devices 104) that may be used to communicate with a base station 102 to enable Internet access. In this implementation, RF signals are affected by a variety of man-made and natural objects, causing multipath interference and fading. To improve performance, this system uses OFDM and non-simultaneous frequency diversity. To implement non-simultaneous frequency diversity, the base station 102 communicates with the remote devices using multiple frequencies. The communications may be scheduled such that all allocated bandwidth may be used at any point in time. In other words, a remote device 104 and a base station 102 communicating with non-simultaneous frequency diversity over multiple frequencies, may be using one frequency at a time. The unused frequencies may be scheduled for use with other remote devices 104 to improve bandwidth utilization.

Referring to FIG. 7B, a base station 102 receives a signal transmitted using non-simultaneous frequency diversity by first receiving a first signal transmitted at a first frequency while simultaneously communicating at a second frequency (752). After a predetermined amount of time, the system receives a second signal transmitted at the second frequency (754). The waiting period may be fixed or may be dynamically adjusted based on system performance.

Once the first signal and second signals have been received, the system identifies the transmitted information based on the two signals (756). Any diversity combining technique may be used to identify the transmitted signal including: selection diversity, equal gain combining, and maximal ratio combining. Using selection diversity, the system simply uses the strongest signal (i.e., the one with the highest signal-to-noise ratio). Using equal gain combining, signals are linearly added. Using maximal ratio combining, weights are calculated to combine the received signals to maximize the signal-to-noise ratio.

Figure 7C:
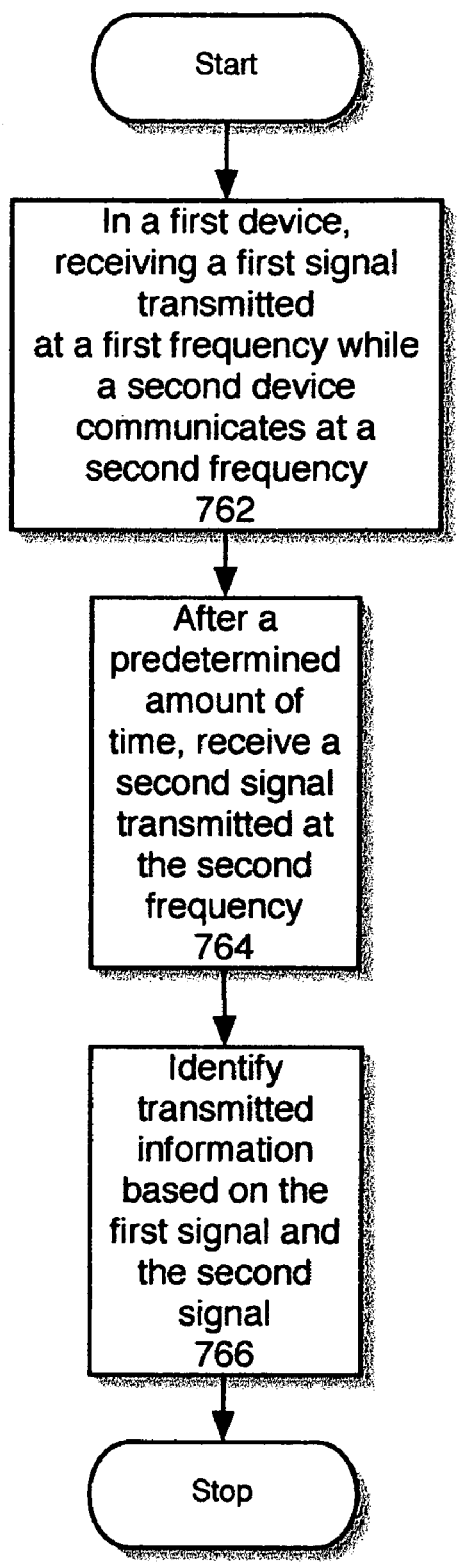

Referring to FIG. 7C, a remote device 104 may receive information in a multi-connection radio system using non-simultaneous frequency diversity by receiving a first signal transmitted at a first frequency while a second device communicates at a second frequency (762). The second device may communicate by transmitting or receiving information with the same base station 102 that the remote device 104 is communicating with or another base station 102. After a predetermined amount of time, the remote device 104 receives a second signal transmitted at the second frequency (764). While the second signal is being received, other devices may be using the first frequency. Once the first signal and second signals have been received, the system identifies the transmitted information based on the two signals (766).

In one implementation, the radio communication system 100 provides broadband wireless Internet services (based on the IEEE 802.16 standard), enabling remote devices 104 to access the Internet (network 106) through the base station 102. The remote devices 104 (also called subscriber units) may be deployed to customer's homes to enable high-speed Internet access similar to that provided by DSL or cable. Many wireless network systems employ orthogonal division multiplexing (OFDM) because it provides high spectral efficiency by spreading signals across a block of frequencies. In this implementation, OFDM is used along with non-simultaneous frequency diversity to improve performance.

Non-simultaneous frequency diversity may be used in any wireless technology to improve system performance without requiring that two disparate RF signals be received at the same time. A number of implementations have been described. Nevertheless, it will be understood that various modifications may be made without departing from the spirit and scope of the invention. Accordingly, other implementations are within the scope of the following claims.

What is claimed is:

1. A radio using non-simultaneous frequency diversity, the radio comprising:
   an antenna;
   a radio frequency module coupled to the antenna such that the radio frequency module is operable to transmit or receive radio frequency signals at a first channel and radio frequency signals at a second channel using the antenna, the radio frequency module comprising:
   a first local oscillator operable to generate a signal;
   a second local oscillator operable to generate a signal;
   an intermediate frequency receiver;
   an intermediate frequency transmitter;
   a receiver mixer coupled to the intermediate frequency receiver and at least one local oscillator;
   a transmit mixer coupled to the intermediate frequency transmitter, the first local oscillator, and the second local oscillator such that the transmit mixer is operable to convert signals between an intermediate frequency and a tranmission frequency, and transmit using non-simultaneous frequency diversity by using the first local oscillator to transmit data at a first frequency and by using the second local oscillator to transmit data at a second frequency; and
   a baseband module coupled to the radio frequency module, the baseband module operable to transmit or receive signals through the radio frequency module, such that signals transmitted or received by the radio employ non-simultaneous frequency diversity using the first channel and the second channel,
   wherein additional devices are operable to use the second channel while the radio is transmitting or receiving radio frequency signals at the first channel.

2. The radio of claim 1 further comprising a second antenna coupled to the radio frequency module.

3. The radio of claim 1 wherein the radio frequency module comprises:
   a zero-if mixer coupled to the first local oscillator such that the zero-if mixer is operable to convert signals from baseband frequencies to transmission frequencies using the first local oscillator.

4. The radio of claim 1 wherein the radio is operable to transmit data using non-simultaneous frequency diversity by using the first local oscillator to transmit data at a first frequency and by using the first local oscillator to transmit data at a second frequency.

5. The radio of claim 1 wherein the receive mixer, the first local oscillator and the intermediate frequency receiver from receive path such that the radio employs non-simultaneous frequency diversity using a single receive path.

6. The radio of claim 1 wherein the baseband module uses orthogonal frequency division multiplexing (OFDM).

* * * * *